Feb. 24, 1953 J. DODDS 2,629,204
SELF-WATERING FLOWERPOT
Filed April 26, 1949
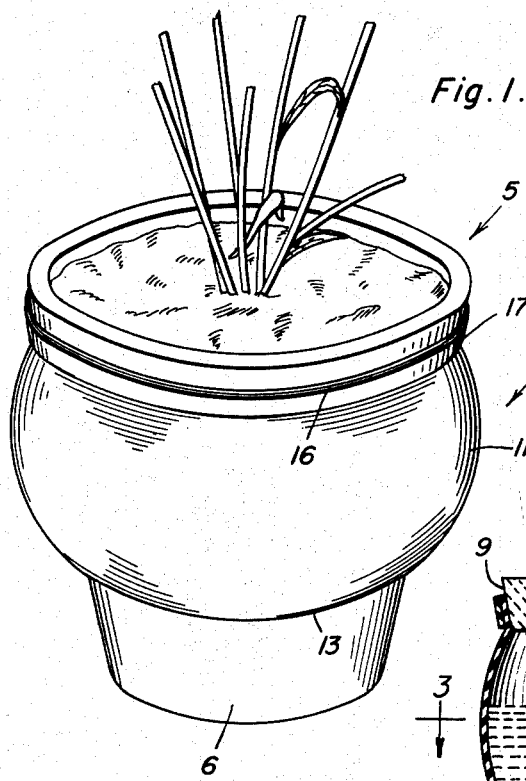
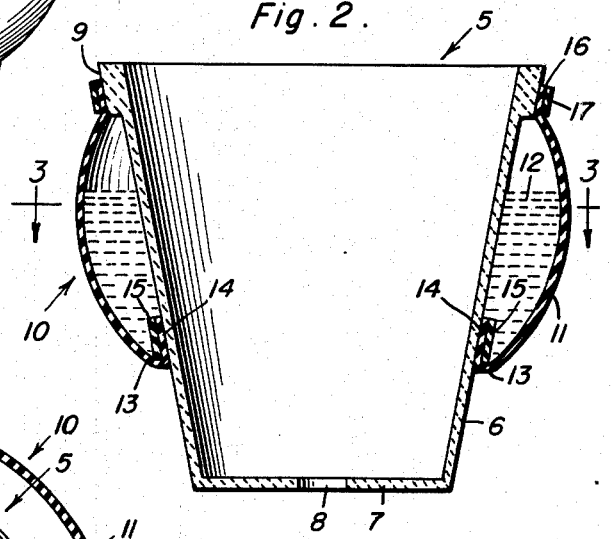
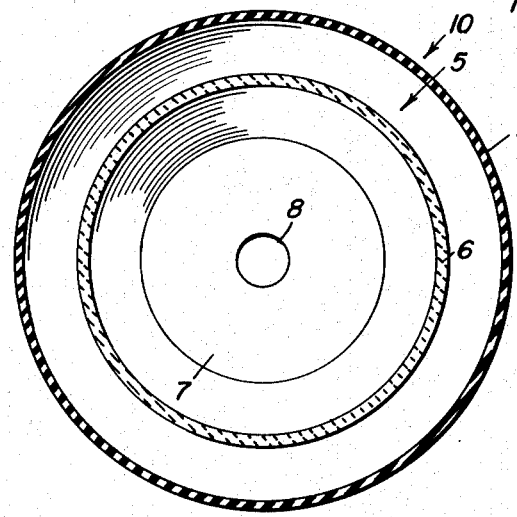
John Dodds
INVENTOR.

Patented Feb. 24, 1953

2,629,204

UNITED STATES PATENT OFFICE 2,629,204

SELF-WATERING FLOWERPOT

John Dodds, Greenville, S. C.

Application April 26, 1949, Serial No. 89,696

2 Claims. (Cl. 47—38)

The present invention relates to flower pots such as are used in greenhouses, homes and elsewhere and has particular reference to an ordinary tapered or frusto-conical flat bottomed clay pot and an exteriorly mounted jacket forming a water containing reservoir and combining with the surrounded wall of the pot in providing a self watering flower pot.

Although the stated jacket may be colored and ornamental in various ways it is not to be confused with decorative wrappers and coverings which usually enclose the entire exterior surfaces of a pot and are employed for purely ornamental purposes.

An object of the invention, therefore, is to provide a waterproof jacket, usually of rubber or equivalent stock which is utilized as a reservoir for water and wherein the water finds its way into the interior of the pot through the existing pores in the porous pot wall.

Another object of the invention is to provide a simple flower pot attachment which is readily applicable and removable and in which users will find their needs fully met, contained and conveniently available, said attachment having its upper and lower end portions expressly made to contact and hug the cooperating portions and surfaces to provide the desired fluid tight sealing result.

A further object is to so construct the attachment that the lower end tightly encompasses the median portion of the tapered pot wall to effect the stated seal, the upper end being radially stretchable to permit the water to be poured into the reservoir after which said upper end retracts and hugs the pot and satisfactorily retards evaporation of the water in said reservoir.

Other objects and advantages will become more readily apparent from the following description of the accompanying illustrative drawings:

In the drawings:

Figure 1 is a perspective view of a so-called self watering flower pot constructed in accordance with the principles of the present invention;

Figure 2 is a central vertical sectional view showing the details and their construction and arrangement; and, Figure 3 is a horizontal section on the line 3—3 of Figure 2, looking in the direction of the arrows.

Referring now to the drawings by distinguishing reference numerals the pot, which is an ordinary clay type, is denoted by the numeral 5 and has a tapered wall 6 and a flat bottom 7 with the usual drainage hole 8. The customary rim or lip 9 may or may not be provided on the upper end portion of the pot.

A jacket and reservoir forming attachment is denoted by the numeral 10 and takes the form of a rubber or equivalent annulus 11 which is molded to retain a concavo-convex form. The texture of the rubber is such that the body portion may distend and bulge to a reasonable degree to form a satisfactory receptacle or reservoir for the water 12. The lower edge portion of the body is turned in as at 13 and then up to provide an annular flange 14 which snugly surrounds the coacting wall portion of the pot. This flange, in turn, is provided with a stout rubber band 15, also endless in form, which provides the desired retentive properties and binds the flange 14 and itself into substantially fluid tight contact with the wall of the pot. Thus, evaporation and leakage from this end is reduced to a minimum. The upper annular end portion 16 also provides another flange and this hugs the pot and is provided with an exteriorly attached contraction band 17 whereby to provide the desired seal at the top of the reservoir. The band 17 is both flexible and resilient to provide an openable and closable mouth for the jacket. Thus, this portion of the jacket may be spread open to permit the water to be poured from a suitable vessel (not shown) into the chamber or reservoir. Briefly then, the structure has to do with a self watering flower pot of imperforate but porous clay and a water charged jacket which exteriorly surrounds the pot and provides the reservoir with water and which therefore provides a handy supply of water for constantly feeding water to the interior of the pot by way of the inherently existing pores in the pot wall. Usually the jacket is of a cross sectional dimension less than the height of the pot and therefore surrounds the upper and intermediate portion and leaves the lower or basal portion uncovered. It is sometimes necessary to place pots of this type into saucers and trays and therefore the attachment should not interfere with such usages.

In practice, the jacket is fitted upwardly from the smaller bottom portion of the pot and when drawn up to the position shown in Figure 2 in which the upper and lower edge portions of the jacket snugly surround the pot.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A self-watering flower pot comprising a conventional type porous clay pot, and a radially and circumferentially contractible and expansible annular elastic jacket exteriorly surrounding the intermediate and upper portions of said pot, said jacket being concavo-convex in cross-section, the upper edge fitting snugly about the cooperating portion of said pot and having an encircling reinforcing elastic band attached thereto, the lower edge portion having a turned in upstanding reinforced binding flange fitting snugly about the coperating body portion of the pot, and the concavo-convex body portion being bellied outwardly, spaced from the pot and cooperating with the latter in defining a water reservoir.

2. An attachment for a conventional clay flower pot which when applied to the pot provides a water containing reservoir, comprising an endless elastic imperforate annulus adapted to provide a water jacket, said annulus being permanently molded to provide a concavo-convex body portion, a reinforced collar flange around the upper edge, said flange being contractile and adapted to snugly and resiliently encircle a cooperating portion of the stated pot, the lower edge portion having a turned in upstanding reinforced binding flange also contractile and adapted to fit snugly about the cooperating body portion of the pot.

JOHN DODDS.

REFERENCES CITED

The following references are of record in the file of this patent:

UNITED STATES PATENTS

| Number | Name | Date |
|---|---|---|
| 954,440 | Klemm | Apr. 12, 1910 |
| 2,123,075 | Langa | July 5, 1938 |
| 2,424,129 | Vincelle | July 15, 1947 |

FOREIGN PATENTS

| Number | Country | Date |
|---|---|---|
| 7,056 | Great Britain | 1901 |
| 5,674 | Great Britain | 1886 |
| 124,699 | Switzerland | Feb. 16, 1928 |